US010344569B2

United States Patent
Christie et al.

(10) Patent No.: US 10,344,569 B2
(45) Date of Patent: Jul. 9, 2019

(54) TOUCH CONTROLLER FOR A DOWNHOLE TOOL

(71) Applicant: SENTERGY LIMITED, Aberdeen (GB)

(72) Inventors: Stewart Gordon George Christie, Aberdeen (GB); Andrew John Elrick, Peterhead (GB); Andrew Fraser, Inverurie (GB); Patrycjusz Bartlomiej Proszynski, Porlethen (GB); Iain Morrison Macleod, Newmachar (GB)

(73) Assignee: Sentergy Limited, Aberdeen (GB)

( * ) Notice: Subject to any disclaimer, the term of this patent is extended or adjusted under 35 U.S.C. 154(b) by 318 days.

(21) Appl. No.: 15/307,722

(22) PCT Filed: Apr. 23, 2015

(86) PCT No.: PCT/GB2015/051199
§ 371 (c)(1),
(2) Date: Oct. 28, 2016

(87) PCT Pub. No.: WO2015/166215
PCT Pub. Date: Nov. 5, 2015

(65) Prior Publication Data
US 2017/0051578 A1    Feb. 23, 2017

(30) Foreign Application Priority Data
May 2, 2014    (GB) .................................. 1407801.8

(51) Int. Cl.
*E21B 41/00*    (2006.01)
*E21B 47/01*    (2012.01)
*G05B 15/02*    (2006.01)

(52) U.S. Cl.
CPC .............. *E21B 41/00* (2013.01); *E21B 47/01* (2013.01); *G05B 15/02* (2013.01)

(58) Field of Classification Search
None
See application file for complete search history.

(56) References Cited

U.S. PATENT DOCUMENTS 5,358,058 A * 10/1994 Edlund .................. E21B 44/00
175/24
2004/0183692 A1  9/2004 Robison et al.
(Continued)

OTHER PUBLICATIONS

International Search Report (PCT/GB2015/051119), dated Dec. 4, 2015.

*Primary Examiner* — Cory W Eskridge
(74) *Attorney, Agent, or Firm* — Gregory L. Porter; Hunton Andrews Kurth LLP

(57) ABSTRACT

A controller (30,300) for mounting on or within a downhole tool (10) is provided and comprises a touch operated control device (32, 320; 36) having a touchable surface (34,340) mounted within an aperture (16) formed in a sidewall (15) of the downhole tool (10) such that the touchable surface (34, 340) is outwardly facing and is the radially outermost component of the controller (30, 300) such that an operator may touch the touchable surface (34, 340) without having to disassemble the downhole tool (10). The controller (30, 300) also comprises one or more microprocessors (44) in electrical or electronic communication with the touch operated control device (32, 320; 36), where the microprocessor (44) is capable of being programmed by an operator to instruct the downhole tool (10) to actuate wherein the operator instructs the controller (30, 300) by touching the touchable surface (34, 340) with one or more distinct touches.

52 Claims, 6 Drawing Sheets

(56) References Cited

U.S. PATENT DOCUMENTS

2007/0168132 A1 7/2007 Yu et al.
2008/0087424 A1 4/2008 McLaughlin

* cited by examiner

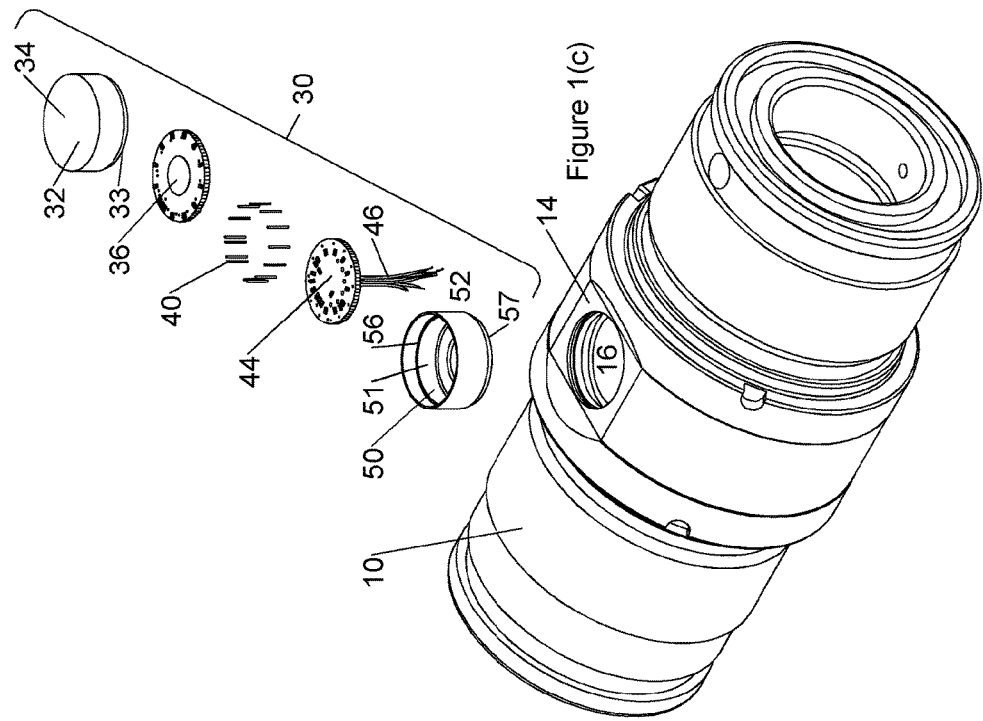
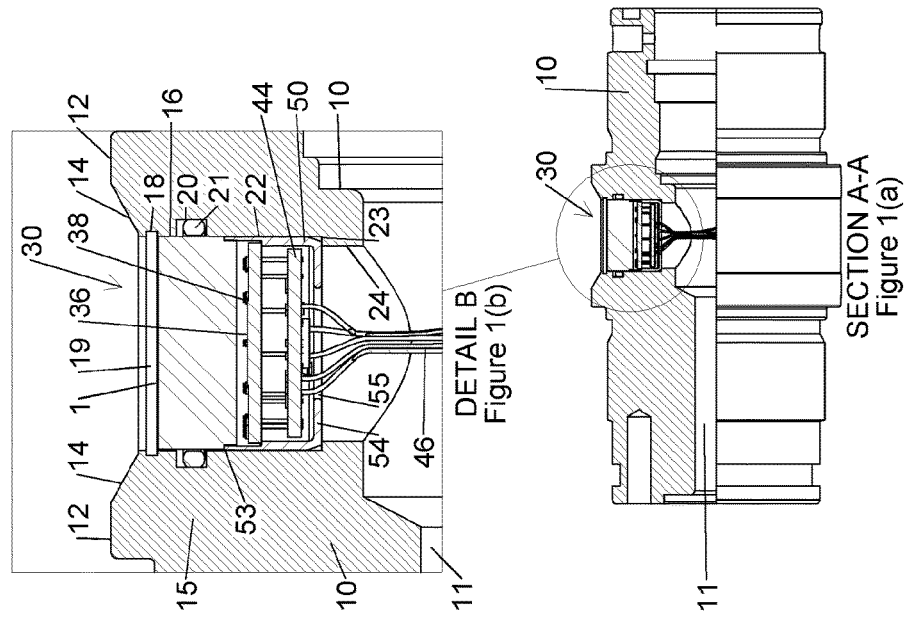

TOUCH CONTROLLER FOR A DOWNHOLE TOOL

The present invention relates to an apparatus and method and more particularly relates to a touch operated control device for use in a downhole tool and a downhole tool comprising a touch operated control device and a method of operating a controller of a downhole tool utilising a touch operated control device.

Conventionally, downhole tools are used in a wide variety of operations in wellbores, particularly relating to hydrocarbon exploration, exploitation and production. Many downhole tools are programmable prior to running in downhole and typically, such programmable downhole tools will either require to be stripped down or dismantled so that an operator can access the electronic circuit boards to programme them or more recently there are some programmable downhole tools which have proposed to be operated with a wired connection to a programming unit such as a PC or laptop or other computer but such wired units suffer from the disadvantage that the wire must be connected to an interface port provided on the outside of the downhole tool via a connector which provides a weak point for the downhole tool both in terms of loading stresses and also in terms of providing a potentially unwanted fluid access via the interface port which needs to be sealed to prevent fluid entering the downhole tool via the interface port under pressure when the tool is run in downhole and possibly at the end of line 25 we need to mention intrinsic safety. In addition, when such wired connections and switches are employed on or in relation to downhole tools, they and any associated equipment (such as the laptop etc.) need to be intrinsically safe (as does all other equipment used on the drill rig floor) due to the possibility of sparking causing an explosion of possible flammable material in the vicinity. Accordingly, it would be desirable to obviate the need for such interface ports on the tool to plug into and also desirable to obviate the requirement to use any additional associated programming equipment (such as a laptop etc.) and thereby obviate any intrinsic safety issues. Further and more recently, it has been proposed to use wireless data transmission means such as Bluetooth or a Wi-Fi connection or an RFID data transmission system to transmit data wirelessly between a computer and the wireless control unit within the downhole tool but such wireless systems can be unreliable and can be prone to wireless data hand shaking errors and additionally there can be similar intrinsic safety issues to those outlined above for the wired connection methods. Furthermore, such wired and wireless data transmission systems mean that there must necessarily be a complicated and/or expensive computer or laptop for use by the operator and which can be prone to being stolen and/or mislaid or lost when the operator is out in the harsh and/or remote offshore or onshore oil and gas fields.

Embodiments of the present invention aim to provide a simplified yet intrinsically safe to operate means of controlling a downhole tool without requiring to strip any part of the tool down to gain access to the controlling mechanism (ie the microprocessor within the downhole tool) and also without requiring additional equipment such as an additional laptop to control and/or send instructions to the downhole tool.

According to a first aspect of the present invention, there is provided a controller for mounting on or within a downhole tool, the controller comprising a touch operated control device.

According to a second aspect of the present invention, there is provided a downhole tool, the downhole tool further comprising a controller which comprises a touch operated control device.

Preferably, the touch operated control device is stationary at all times during use and does not require to be moved or switched like a button or switch would require to be moved. Embodiments of the present invention therefore have the considerable advantage over existing downhole tool switch mechanisms in that there are no moving buttons or switches that otherwise could present a fluid leak path and/or could present a mechanical weak point in the downhole tool.

Preferably, the controller further comprises one or more microprocessor means which are preferably in communication with the touch operated control device.

More preferably, the one or more microprocessor means are in electrical or electronic communication with the touch operated control device. Typically, the microprocessor is capable of being programmed by an operator to instruct a downhole tool (which may or may not be the downhole tool on or in which the controller is mounted) to actuate, particularly preferably after a period of time has elapsed wherein the operator instructs the controller by touching the touch operated control device with one or more distinct touches.

Preferably, the touch operated control device is adapted to sense one or more touches from an operator and more preferably is adapted to sense the time duration of each touch wherein the one or more touches and preferably the duration of the touches can represent instructions from an operator.

More preferably, the touch operated control device comprises a touchable surface and the touch operated control device is preferably adapted to sense an operator touching the touchable surface. Typically, the touchable surface is mounted on or in the downhole tool such that the touchable surface is outwardly facing and is provided on or in an outer surface of the downhole tool such that an operator may touch the touchable surface without having to disassemble the downhole tool. Preferably, the downhole tool comprises a housing which may be a generally cylindrical or tubular housing and which may further comprise a throughbore, and which may comprise an aperture formed in a sidewall and more preferably, the controller is mounted within the aperture. Typically, the controller is mounted within the aperture such that the touchable surface is the radially outermost component of the controller. The controller is typically mounted within the aperture such that the touchable surface faces outwardly therefrom. The controller may be retained within the aperture by a locking means which may be a selective locking means such as a circlip or split ring.

Preferably the touchable surface is a surface of a window and more preferably the window comprises a transparent window through which light may pass without substantial restriction and through which an operator may preferably view one or more components located beneath the window. Preferably, the one or more components may be one or more visual indication means and which may be one or more light displays or emitters such as one or more Light Emitting Diodes (LEDs).

Typically, the controller further comprises a sealing means to seal the said aperture with respect to the window and preferably, a sealing means to seal a gap between an inner surface of the said aperture and an outer surface of the said window and more preferably, a sealing means to seal the gap between an inner cylindrical bore of the said aperture and an outer sidewall of the said window. Typically, the aperture comprises a cylindrical groove formed in its inner cylindrical bore wherein the cylindrical groove comprises a larger diameter than the diameter of the rest of the inner cylindrical bore of the aperture and wherein the sealing means is preferably located within the said cylindrical groove and is sufficiently sized so as to act at least against the outer sidewall of the window and the outer diameter of the cylindrical groove. Preferably, the sealing means comprises an O-ring seal or the like.

Preferably, the window comprises an outer diameter which is slightly less than the inner diameter of the said cylindrical bore of the aperture such that it is a sliding fit or clearance fit therein.

Preferably, the controller further comprises a controller housing which is preferably cylindrical and which comprises a bore within which one or more components may be housed. Preferably, the microprocessor may be housed within the said bore of the controller housing. Alternatively, or additionally, the one or more light displays may also be housed within the said bore of the controller housing. Preferably, the one or more light displays are mounted on a board which may be a printed circuit board and more preferably, a plurality of light displays are mounted around a periphery of the board, most preferably, in a clock face arrangement with 12 light displays being equi-spaced around the periphery of the board. Preferably, the controller housing comprises an angled surface adapted to reduce the risk of or prevent damage occurring to the sealing means as the controller housing is moved past the sealing means during installation of the controller housing within the aperture.

Preferably, the touch operated control device further comprises a touch sensor which is adapted to sense if and/or when the said surface of the window is touched and more preferably the touch sensor is adapted to sense if and/or when the said surface of the window is touched by a body part of an operator such as a finger, thumb or other portion of a hand of an operator.

Preferably, in use, the touch sensor is located radially inwardly of the window and is therefore located closer to the longitudinal central axis of the downhole tool when compared with the window and more preferably the touch sensor is adapted to sense if and/or when the said surface of the window is touched by a body part of an operator through the depth of the window. Preferably, the touch sensor is also housed within the bore of the said housing.

Preferably, the window is formed of glass and more preferably is formed of sapphire. Preferably, the depth of the window is in the region of 20% to 50% of the diameter of the window and more preferably is in the region of 30% to 45% of the diameter of the window and most preferably is in the region of 36% to 39% of the diameter of the window.

Typically, the touch sensor comprises an electrical conductor which when a voltage is applied thereto, creates a uniform electrostatic field in at least a region of the window. Preferably, the touch sensor is arranged such that an operator touching the outer surface of the window creates a capacitor which is sensed by the touch sensor and instructs the microprocessor accordingly. Preferably, the touch sensor comprises a substantially circular touch pad and which is preferably located at the centre of a board. More preferably, the plurality of light displays are mounted around the periphery of the board such that the plurality of light displays are equi-spaced with respect to each light display on either side and most preferably, each of the plurality of light displays are located the same distance apart from the closest point of the circular touch pad to that light display.

This provides the advantage that each of the light displays is located the same distance away from the circular touch pad and therefore minimises the risks that any one light display will interfere with the operation of the circular touch pad.

The controller may be pressure balanced in that the pressure experienced on one face of the window may be substantially pressure balanced with the pressure experienced on the other face of the window. This provides the advantage that the pressure on the inner face of the window is substantially the same as the pressure on the outer face of the window and therefore there is substantially no differential pressure across the window and therefore there is substantially no resultant force acting to move the window in one direction or the other.

Alternatively, the controller may be pressure retaining in that the controller is arranged to prevent the pressure outside of the downhole tool and therefore acting on the outer face of the window from being communicated to the inside of the downhole tool and therefore prevented from acting on the inner face of the window, in which case the controller is adapted to prevent the resulting differential pressure from moving the window inwardly. Typically, the pressure balanced controller may comprise a window having tapering sidewalls which taper inwardly from radially outermost to innermost with reference to the longitudinal axis of the downhole tool and which are arranged to abut against and therefore spread the load against a sidewall of the downhole tools which tapers inwardly from radially outermost to innermost with reference to the longitudinal axis of the downhole tool and most preferably, the angle of the taper of the sidewall of the window substantially equals the angle of the taper of the sidewall of the downhole tool.

Preferably, the controller further comprises a power supply to power the said touch pad and/or the microprocessor and/or the light displays. The power supply Preferably, the touch pad and the microprocessor are arranged such that every separate and distinct touch by an operator of the said surface of the window is registered and more preferably acted upon by the microprocessor.

Typically, an operator actuates the controller to activate by touching the said surface of the window for at least a pre-determined period of time (for example three seconds).

Typically, the controller is adapted to flash one or more of the light displays if the controller is activated. Preferably, the controller is de-activated if no further touches are sensed within a pre-determined period of time (for example 10 seconds).

Typically, if further touches are sensed by the touch sensor within the said further pre-determined period of time (for example 10 seconds), then the microprocessor stores the said number of touches and assigns a pre-determined time value to each sensed touch (for example one hour) and as each touch is sensed, the controller preferably activates one said light display for each touch sensed and more preferably, activates each said light display in turn in a clockwise direction around the clock-like arrangement of the plurality of light displays.

Preferably, the microprocessor comprises a confirmation signal which may comprise a period of time (such as ten seconds) elapsing after the last registered touch and may further comprise a further touch being registered within a yet further period of time (such as another ten seconds) wherein if no said confirmation touch is received then the controller resets back to its just activated state but if said confirmation touch is received then the controller enters a diagnostic test phase which if conducted successfully, the controller then enters a ready to run in downhole phase. Typically, the controller comprises a further sensor such as a temperature or a pressure or a depth sensor or a motion sensor and which is capable of instructing the microprocessor that the downhole tool has been run in downhole. Preferably, once the further sensor instructs the microprocessor that the downhole tool has been run in downhole, the microprocessor starts a countdown to tool activation phase wherein each lit light display equals a pre-determined period of time (such as one hour) which together add up to the total period of time before which the controller instructs the actuation of the downhole tool that requires to be actuated.

Preferably, if the controller remains stationary for more than a predetermined period of time (for example 6 hours) at a temperature less than a pre-determined temperature (for example 50° C.) then the microprocessor will deactivate and switch off and this has the advantage that the power supply will last longer compared with if no de-activation occurred.

According to a further aspect of the present invention, there is provided a method of operating a controller of a downhole tool, the method comprising the steps of:
  providing a controller comprising a microcontroller and a touch operated control device;
  actuating the controller to activate by touching the said touch operated control device for at least a pre-determined period of time; and
  sensing further touches within a further pre-determined period of time, the microprocessor storing the said number of touches and assigning a pre-determined instruction to each sensed touch.

The pre-determined instruction may be a period of time before the controller instructs the said downhole tool or a further downhole tool to actuate. Alternatively, or in addition, the pre-determined instruction may be an instruction to actuate a particular downhole tool from a selection of downhole tools.

The downhole tool to be actuated and/or otherwise controlled by the controller may be any downhole tool requiring to be controlled or actuated such as (but not limited to) a setting tool (for setting e.g. a packer or other downhole sealing tool), a packer or other downhole sealing tool, a sliding sleeve tool, a set of one or more perforating guns, a wireline cutter or the like.

In the description that follows, like parts are marked throughout the specification and drawings with the same reference numerals, respectively. The drawings are not necessarily to scale. Certain features of the invention may be shown exaggerated in scale or in somewhat schematic form, and some details of conventional elements may not be shown in the interest of clarity and conciseness. The present invention is susceptible to embodiments of different forms. There are shown in the drawings, and herein will be described in detail, specific embodiments of the present invention with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce the desired results.

The following definitions will be followed in the specification. As used herein, the term "wellbore" refers to a wellbore or borehole being provided or drilled in a manner known to those skilled in the art. The wellbore may be 'open hole' or 'cased', being lined with a tubular string. Reference to up or down will be made for purposes of description with the terms "above", "up", "upward", "upper" or "upstream" meaning away from the bottom of the wellbore along the longitudinal axis of a work string toward the surface and "below", "down", "downward", "lower", or "downstream" meaning toward the bottom of the wellbore along the longitudinal axis of the work string and away from the surface and deeper into the well, whether the well being referred to is a conventional vertical well or a deviated well and therefore includes the typical situation where a rig is above a wellhead, and the well extends down from the wellhead into the formation, but also horizontal wells where the formation may not necessarily be below the wellhead. Similarly 'work string' refers to any tubular arrangement for conveying fluids and/or tools from a surface into a wellbore.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one embodiment can typically be combined alone or together with other features in different embodiments of the invention. Additionally, any feature disclosed in the specification can be combined alone or collectively with other features in the specification to form an invention.

Various embodiments and aspects of the invention will now be described in detail with reference to the accompanying figures. Still other aspects, features, and advantages of the present invention are readily apparent from the entire description thereof, including the figures, which illustrates a number of exemplary embodiments and aspects and implementations. The invention is also capable of other and different embodiments and aspects, and its several details can be modified in various respects, all without departing from the spirit and scope of the present invention.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

Accordingly, the drawings and descriptions are to be regarded as illustrative in nature, and not as restrictive. Furthermore, the terminology and phraseology used herein is solely used for descriptive purposes and should not be construed as limiting in scope. Language such as "including", "comprising", "having", "containing" or "involving" and variations thereof, is intended to be broad and encompass the subject matter listed thereafter, equivalents, and additional subject matter not recited, and is not intended to exclude other additives, components, integers or steps. In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or "is" preceding the recitation of the composition, element or group of elements and vice versa. In this disclosure, the words "typically" or "optionally" are to be understood as being intended to indicate optional or non-essential features of the invention which are present in certain examples but which can be omitted in others without departing from the scope of the invention.

All numerical values in this disclosure are understood as being modified by "about". All singular forms of elements, or any other components described herein including (without limitations) components of the downhole tool or controller are understood to include plural forms thereof and vice versa.

Embodiments of the aspects of the present invention will now be described, by way of example only, with reference to the accompanying drawings, in which:

FIG. 1A is a part cross-sectional side view of a downhole tool comprising a touch controller or touch operated control device in accordance with one or more aspects of the present invention;

FIG. 1B is a detailed view of part of FIG. 1A showing the touch controller in more detail;

FIG. 1C is an exploded perspective view of the downhole tool and the various components of the touch controller of FIG. 1A.

Figure 2:
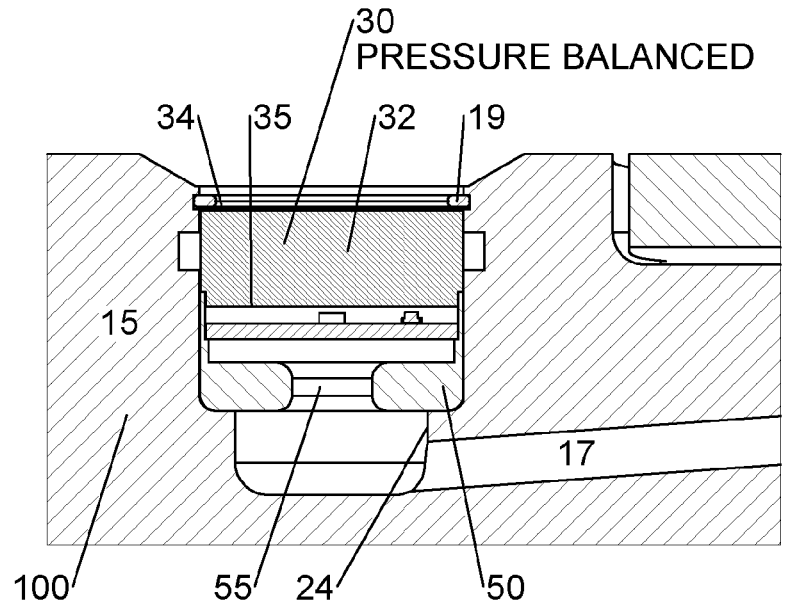
FIG. 2 is another cross-sectional side view of one embodiment of a touch controller comprising a pressure balanced touch controller and which is the embodiment of touch controller shown in FIG. 1B.

FIG. 1A shows a downhole tool housing 10 for inclusion or incorporation into a downhole tool (not shown) which can be deployed into a wellbore or borehole (not shown) by means of a downhole string (not shown) such as part of a bottom hole assembly (not shown) or may be included in the downhole string generally (not shown) at a location relatively close to a further downhole (not shown) tool such as a setting tool for setting a packer or for operating a sliding sleeve or downhole motor or any other downhole tool that requires to be actuated at some point during a downhole trip when for example exploring or exploiting or producing hydrocarbons. The downhole tool housing 10 comprises suitable connections at each end so that the downhole tool housing 10 can be securely incorporated into the downhole tool and the downhole tool as a whole will typically comprise suitable connections at each end such as OCTG threaded connections or other industry standardised or non-standardised connections including those licensed/authorised by the American Petroleum Institute (API) enable it to be connected to other components in the downhole string. The downhole string may be any suitable downhole string as required such as a drill pipe string, a slickline, an electric line or coiled tubing string or other work string.

The downhole tool housing 10 comprises a generally cylindrical outer housing and a through bore 11 through which downhole fluids may flow if required. The downhole tool housing 10 further comprises a greater outer diameter portion 12 located approximately at its longitudinally mid point and within the greater outer diameter portion 12 is a recessed portion 14 and which, as will be described subsequently, provides protection for a touch controller 30 as the greater diameter portion 12 is of a greater outer diameter than the recessed portion 14 and therefore protects the recessed portion 14 and more importantly the touch controller 30 from collisions with the wellbore as the downhole string is being run in and also some element of protection from downhole fluids and solids flowing past. A generally cylindrical aperture 16 is formed at least part way through the side wall 15 of the downhole tool housing 10 such that the longitudinal axis (not shown) of the aperture 16 is substantially perpendicular to the longitudinal axis of the downhole tool housing 10 such that the longitudinal axis of the aperture 16 projects outwardly in a radial direction from the through bore 11. The aperture 16 of the housing 10 comprises from radially outermost to radially innermost:

a circumferential groove 18 for housing a split ring or circlip 19 in order to retain the touch controller 30 within the aperture 16 as will be described subsequently;

a further circumferential groove 20 for housing an O-ring 21 and which in use will be arranged to be aligned with and in contact with an outer peripheral surface of a transparent glass window 32 of the touch controller 30;

a side wall 22 which extends radially towards an aperture shoulder 23; and an aperture shoulder 23 which as will be described subsequently provides a stop or an abutment shoulder for a touch controller base or holder 50 for the pressure balanced embodiment of the touch controller 30 as shown in FIGS. 1A, 1B and 1C, as will be subsequently described.

The aperture shoulder 23 preferably comprises a radially inwardly projecting shoulder 23 formed approximately at 90 degrees to the side wall 22 and which is therefore formed substantially perpendicular to the longitudinal axis of the aperture 16. The aperture shoulder 23 then leads into an access port 24 which forms an aperture for wiring 46 which leads from a controller PCB 44 of the touch controller 30 as will be described subsequently and which will lead to downhole tools or components to be controlled or actuated by the controller PCB 44 such as motors or the likes. The access port 24 typically comprises a diameter which is less than the diameter of the aperture 16 and again comprises a substantially cylindrical through bore.

Figure 8:
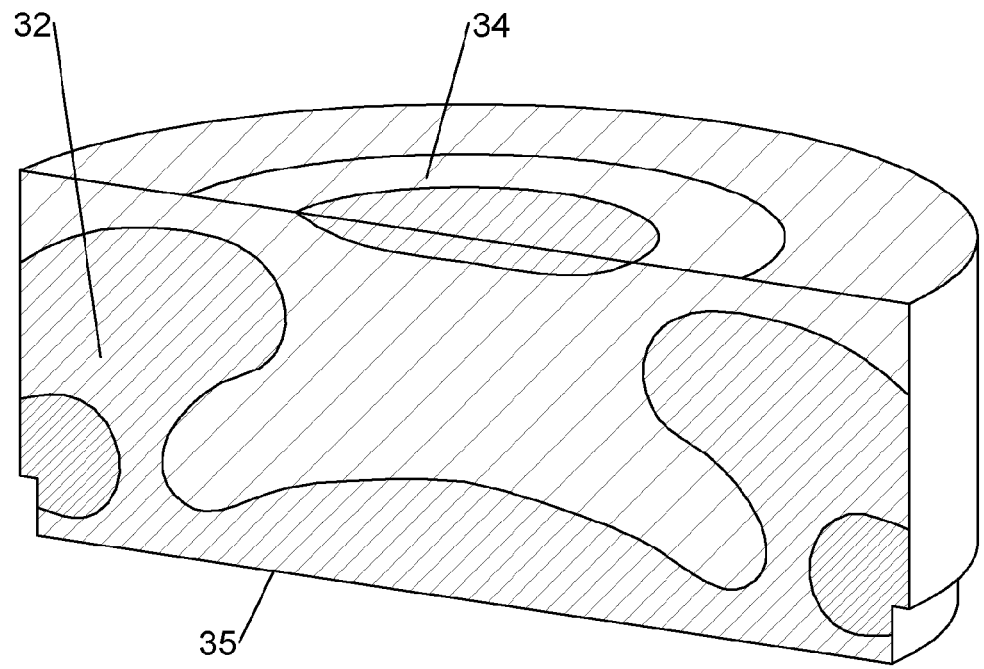
FIG. 8 is a finite element analysis image of the sapphire glass window of the touch controller of FIGS. 1B, 2 and 7 if it were placed under compressive stress loading.

The touch controller 30 as seen in FIG. 1C in an exploded view and in FIG. 1B in an assembled and installed configuration, comprises (from radially inwardly to outwardly with respect to the downhole tool housing 10) comprises a base or holder 50 which is a substantially annular ring 52 with a hollow through bore 51 for housing a controller PCB 44 and an electronic touch PCB 36 which are connected to one another by and therefore separated by wire connectors 40. The touch controller holder 50 comprises at its radially outermost end a top edge 53 and which provides a shoulder upon which a transparent glass window 32 will be mounted, the transparent glass window 32 comprising at its radially innermost end a circumferential groove 33 and which will fit within the through bore 51 at the outermost end of the holder 50. The main contact area between the transparent glass window 32 and the holder 50 is therefore the surface area of the top edge 53 and its downwardly facing mating face of the glass window 32 which is a relatively small surface area but because the touch controller 30 is pressure balanced between the outside of the tool housing 10 with the through bore 11 of the housing 10, the stress levels will not be overly concerning and will therefore not reach the critical levels shown in FIG. 8 which would occur if the glass window 32 was placed under unwanted compression.

The holder 50 comprises an inwardly projecting bottom end 54 which retains the controller PCB 44 within the holder 50 and prevents it from falling inwards into the through bore 11. The holder 50 comprises an aperture 55 for the wires 46 of the controller PCB 44 to project through and thereafter into the access port 24. The housing 50 further comprises a ledge 56 upon which the lower face of the touch pad PCB 36 may rest.

In order to install the touch controller 30 into the downhole tool housing 10 and therefore mount the touch controller 30 within the downhole tool housing 10, the controller PCB 44 is firstly placed within the housing 50 such that its lower face rests upon the inwardly projecting bottom end 54. Wire connectors 40 are then connected to the controller PCB 44 upper face and are then connected to the lower face of the electronic touch PCB 36 which is placed into the holder 50 such that it rests upon the ledge 56. The transparent glass window or lens 32 is then placed on top of the top edge 53 such that the circumferential groove 33 mates with the top edge 53.

The touch controller 30 is then offered up to and placed within the aperture 16 of the downhole tool housing 10. However, prior to that occurring, an O-ring 21 is placed within the circumferential groove 20.

It should be noted that the lower edge 57 of the holder 50 is chamfered such that the chamfered lower edge 57 reduces the risks of the O-ring 21 being torn or ripped or otherwise damaged or dislodged from the circumferential groove 20 as the lower edge 57 passes the O-ring 21. In other words, the chamfer or angled face of the lower edge 57 will tend to squeeze the inner surface of the O-ring 21 outwardly as it passes through the O-ring 21 rather than presenting a sharp edge which could cut or tear the O-ring 21.

The holder 50 and the transparent glass window 32 are dimensioned such that once the lower face of the holder 50 meets and therefore abuts the aperture shoulder 23 of the housing 10, the upper face of the transparent glass window 32 will be longitudinally aligned with or will be located radially just inwardly of the circumferential groove 18 such that a circlip or split ring 19 can be inserted into the circumferential groove 18 such that the circlip or split ring 19 gently contacts the upper face 34 (and which in use will therefore be the outwardly projecting face 34) of the transparent glass window 32. Consequently, the split ring 19 will therefore retain all of the components of the touch controller 30 within the aperture 16 at least until the operator wishes to remove the touch controller 30 from the aperture 16 at which point he or she can bring the two ends (not shown) of the split ring 19 together and therefore remove the split ring 19 and therefore remove the window 32 and then the rest of the components of the touch controller 30.

FIG. 2 shows a slightly different embodiment of downhole tool housing 100 compared with the embodiment of downhole tool housing 10 shown in FIG. 1A. The main notable difference in the housing 100 compared with the housing 10 is that in the housing 100, there is further provided a conduit 17 for wiring 46 such that instead of the wiring 46 projecting downwardly through the aperture 55 and then through the access port 24 and directly into the through bore 11, the wiring 46 projects downwardly through the aperture 55 and through the access port 24 but will then be directed along conduit 17 to for example a power supply (not shown) for the components of the controller 30 that require power and to any other components or downhole tools that are intended to be controlled or actuated by the controller 30, such as a motor, etc.

Figure 3:
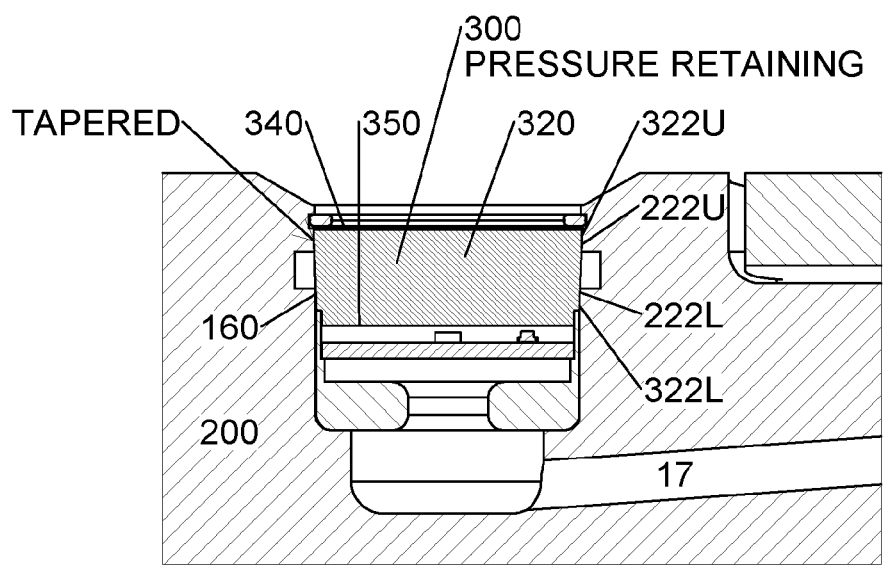
FIG. 3 is a second embodiment of a touch controller or touch operated control device in accordance with the present invention comprising a pressure retaining touch controller.

An alternative embodiment of a pressure retaining (ie not pressure balanced) touch controller 300 is shown in FIG. 3. The main difference between the pressure retaining touch controller 300 and the pressure balanced touch controller 30 is that the side wall 322U, 322L of the transparent glass window 320 of FIG. 3 is tapered along its longitudinal length instead of having the parallel side walls of the transparent glass window 32.

Figure 9:
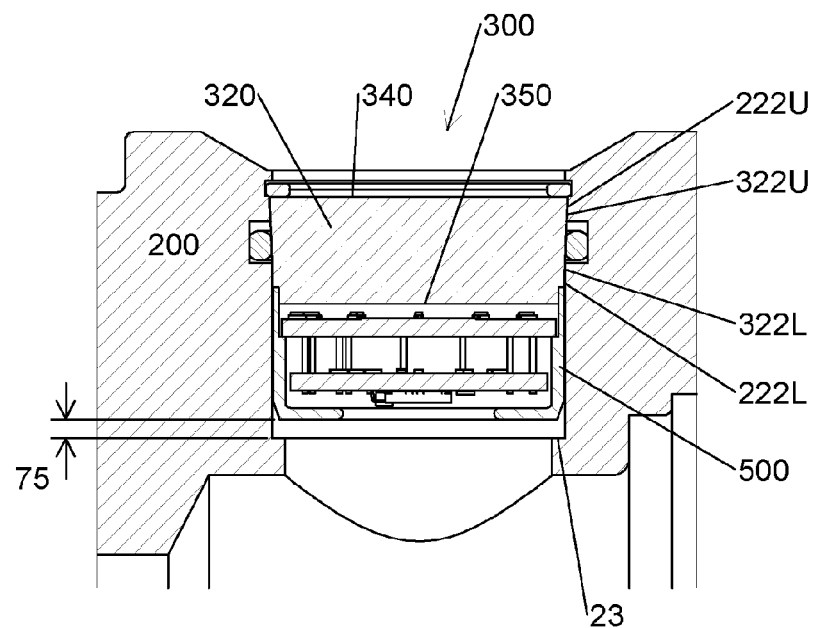
FIG. 9 is a more detailed view of the pressure retaining touch controller as shown in FIG. 3.
Figure 10:
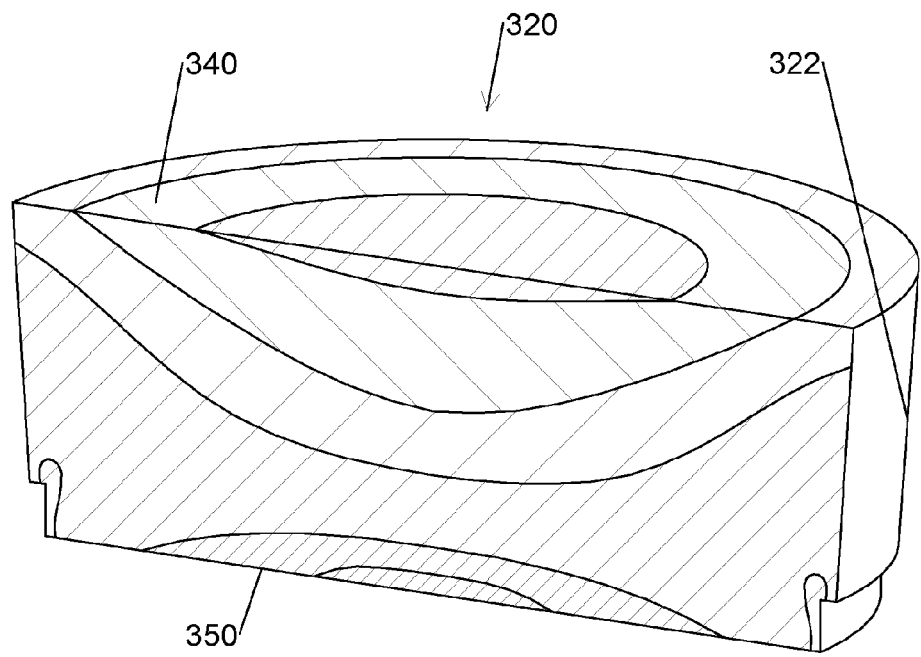
FIG. 10 is a finite element analysis image of the sapphire window of the touch controller of FIGS. 3 and 9.

Similarly, the side wall 222U, 222L of the aperture 160 of the pressure retaining touch controller embodiment 300 is also tapered compared with the parallel side walls 22 of the pressure balanced embodiment of outer housing 10 shown in FIG. 1A. The tapered side walls 222U, 222L of the housing 200 shown in FIG. 3 are angled at the same angle as the tapered side walls 322U, 322L of the tapered glass window 320 such that when the alternative embodiment of the touch controller 300 is placed within the aperture 160 of FIG. 3, the tapered side walls 322 of the glass window 320 will come to rest against the tapered side wall 222 of the housing 200 and there will therefore be a much greater contact surface area between the glass window 320 and the housing 200 such that when the alternative embodiment touch controller 300 as shown in FIG. 3 is run downhole, the relatively high pressure of the downhole fluid on the outside of the tool housing 200 will act against the upper face 340 of the tapered glass window 320 and will force the glass window 340 inwardly relative to the outer housing 200. However, the much greater surface area of contact between the tapered side walls 322 and the tapered side walls 222 will mean that the tapered window 320 will not suffer any significant point loading and therefore will not crack or shatter under the relatively high differential pressure between the outside of the downhole tool housing 200 and the inner through bore of the downhole tool housing 200. As can be seen in FIG. 9, there is a gap 75 provided between the lower end of the housing 500 used in the pressure retaining touch controller 300 and the aperture shoulder 23 such that no load is transferred from the tapered lens 320 to the holder 500 when the pressure retaining touch controller 300 is under the relatively high pressure differential when downhole.

Consequently, there are two embodiments of the touch controller disclosed herein, firstly a pressure balanced touch controller 30 and secondly a pressure retaining touch controller 300. In pressure balanced applications, the electronics of the pressure balanced touch controller 30 such as the electronic touch PCB 36 and the controller PCB 44 are balanced to well pressure but in other applications where a touch controller could be used, this may not be possible and therefore the pressure retaining touch controller 300 embodiment can be used instead.

Figure 4:
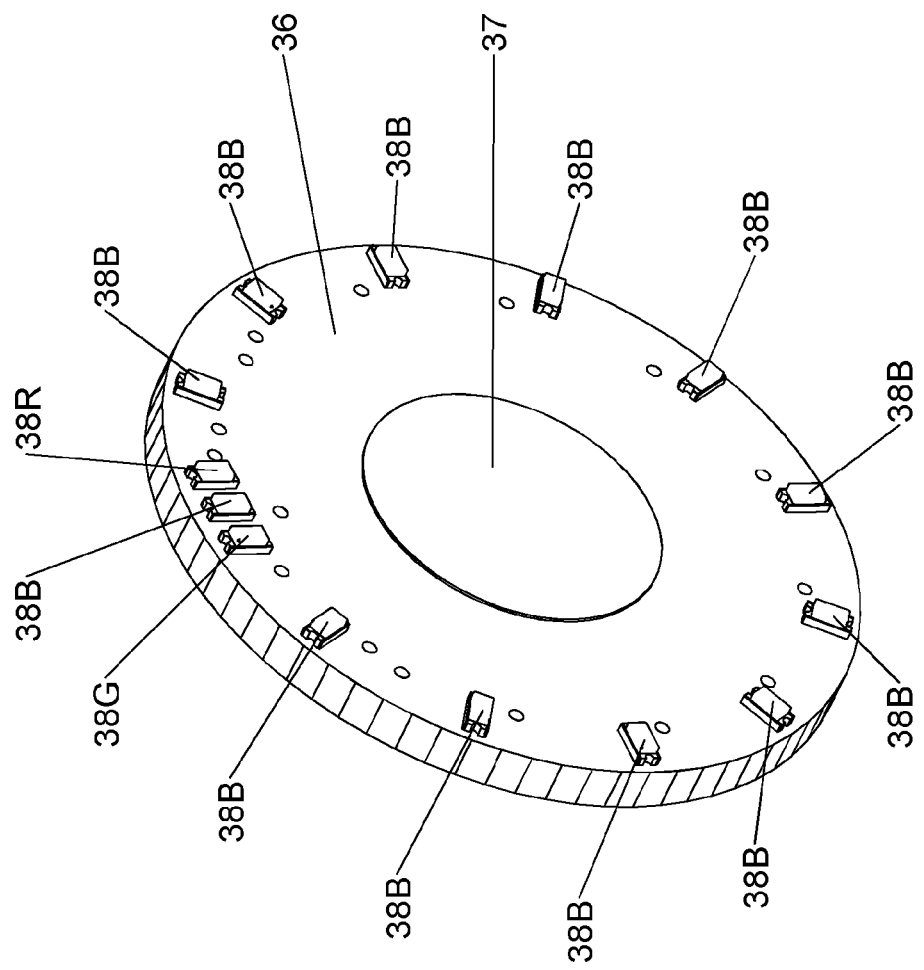
FIG. 4 is a perspective view of the side edge and the front face of a printed circuit board comprising a touch pad and a number of LEDs and which forms part of the touch controller shown in FIG. 1C.
Figure 5:
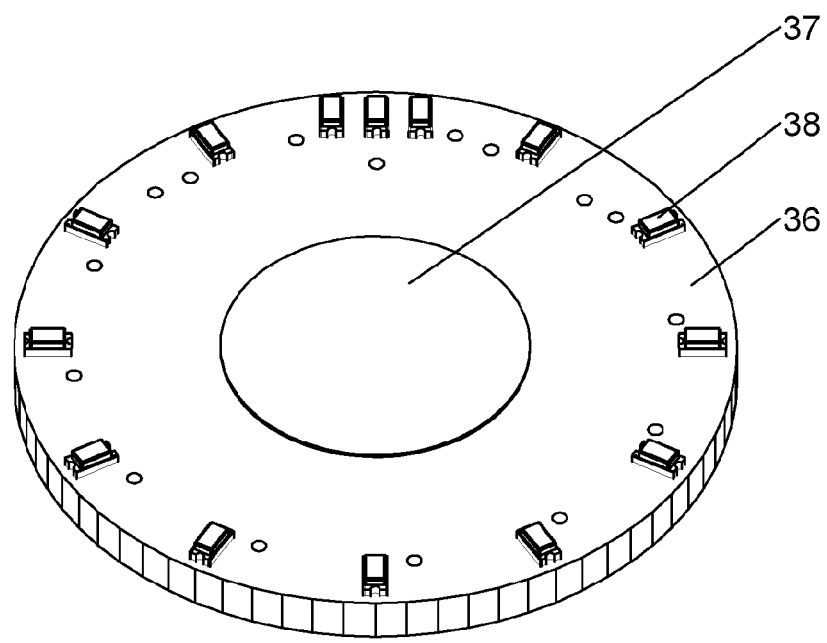
FIG. 5 is a plan view of the printed circuit board, touch pad and the LEDs as shown in FIG. 4.
Figure 6:
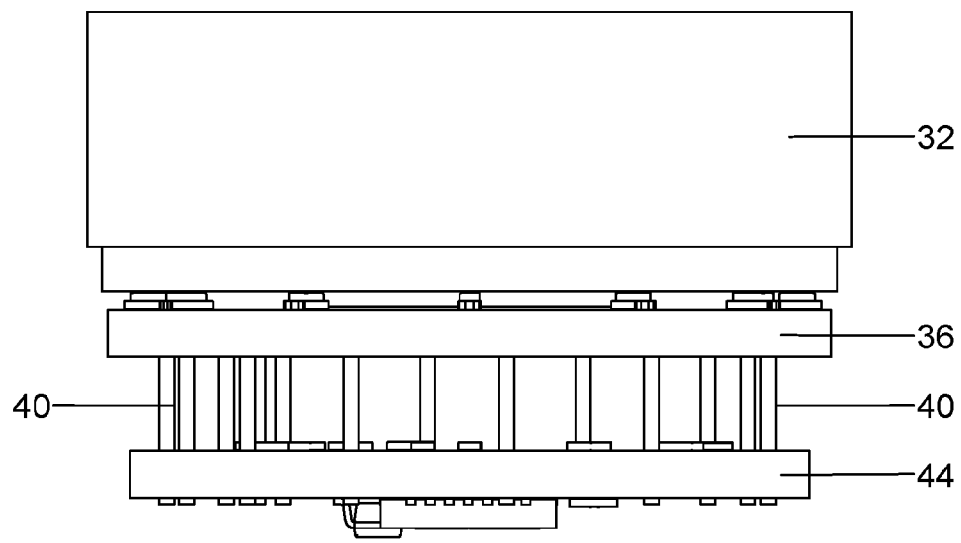
FIG. 6 is a side view of the touch controller as shown in FIGS. 1A, 1B and 1C with the housing omitted for reasons of clarity of the other components.
Figure 7:
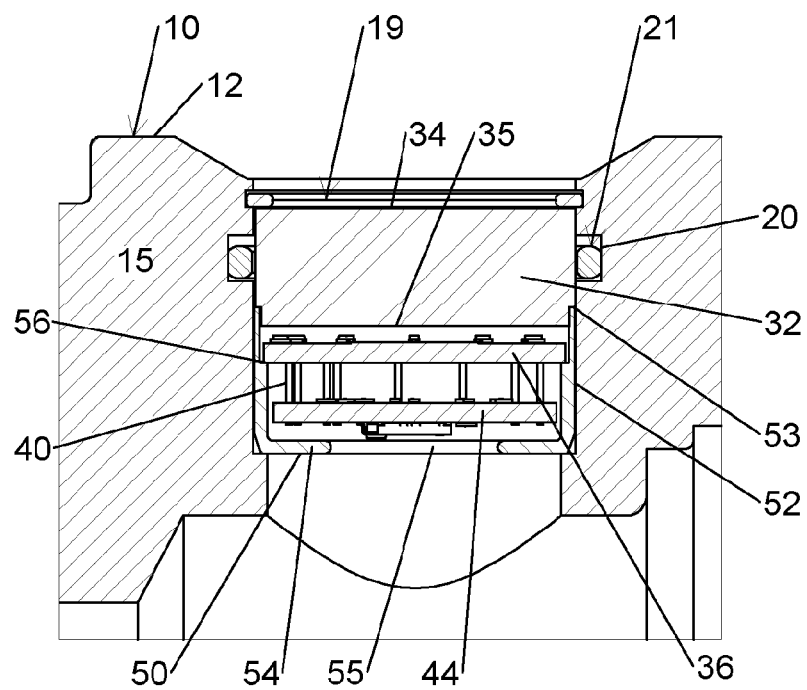
FIG. 7 is a further and more detailed view of the pressure balanced touch controller as shown in FIG. 1B.

The touch PCB 36 is shown in more detail in FIGS. 4 and 5, and comprises a touch pad 37 and which is preferably cylindrical in shape at its centre. The touch pad 37 in the embodiment disclosed herein is in the region of 10 mm in diameter and preferably comprises a capacitive touch pad 37. However, it should be noted that other touch pads could be used such as resistive touch pads (not shown) or infrared beam touch pads.

Moreover, the capacitive touch pad 37 is preferably a surface capacitance touch pad 37 but it should be noted that other capacitive touch pads could be used such as projected capacitance or mutual capacitance or self-capacitance touch pads.

The surface capacitance touch pad 37 is designed to be used in conjunction with the transparent glass window 32 which is preferably a sapphire glass window.

When the surface capacitive touch pad 37 is powered by a suitable power supply such as a battery, it emits an electric field which results in the creation of a base line electric field which has a given capacitance. In use, when a semiconductor such as a human finger, touches the surface of the upper face 34, 340, a capacitor is dynamically formed and which can be sensed by the electronic PCB 36 and/or the touch controlled PCB 44. In other words, the touch controller 30, 300 can determine from the change in measured capacitance that the glass window 32, 320 has been touched.

The electronic touch PCB 36 further comprises a plurality of information indication means and preferably comprises a plurality of lights in the form of LEDs 38 located around its periphery. Most advantageously, the LEDs 38 are arranged in a manner similar to a clock face where an LED 38 is provided at each hour around the clock face. Accordingly, in the example shown in FIG. 4, there are twelve blue coloured LEDs 38B equi-spaced around the outer periphery of the electronic touch PCB 36. Furthermore, another pair of LEDs 38R, 38G are provided at the "twelve o'clock" position, either side of the twelve o'clock blue LED 38B and specifically there is provided a red LED 38R and a green LED 38G. The skilled person will note however that other colours may be used instead.

Each of the blue LEDs 38B are used to indicate time such as an hour and the red 38R and green 38G LEDs are used to provide status information.

The controller PCB 44 comprises a microprocessor in the form of a micro controller for the touch pad 37, this being the main micro controller which handles communication between the touch controller 30, 300 and the components or downhole tools to be controlled and further comprises current limit resistors for the fourteen LEDs 38 provided around the electronic touch PCB 36. The two PCB boards 44, 36 are interconnected by means of tinned copper wire 40 or other suitable wire connectors 40 such that the two boards 36, 44 are spaced apart by approximately 4 mm.

The skilled person should note that there is an optimum distance, which for this specific example may be in the region of 3-10 mm and may more specifically be in the region of 5-6 mm for the distance between the touch pad 37 and the LEDs 38 in that over this distance the LEDs 38 may not deflect the electrostatic field produced by the touch pad 37 whilst also maintaining appropriate touch sensitivity between the touch pad 37 and the upper most face 34, 340 of the sapphire glass window 32, 320 and that distance is approximately in the region of 8-15 mm and preferably in the region of 12 mm.

Preferably, the sapphire glass window 32, 320 may be in the region of one inch (25.4 mm) for certain downhole tool sizes. The skilled person will realise that downhole oil tools are restricted in diameter due to well construction/architecture limitations and for example, a downhole tool which is suitable for using the touch controller 30, 300 disclosed herein may have an outer diameter in the region of 2.250 inches but most other downhole tools that will use the embodiments disclosed herein are likely to be larger outer diameter than that and therefore it is considered that the window 32, 320 diameter of one inch is likely to be optimum in terms of providing a standard size for all downhole oilfield equipment in which the touch controller 30, 300 is to be mounted. The skilled person will also realise that the window 32, 320 must have a large enough diameter to accommodate an operator's finger whilst also allowing visibility of LEDs on the electronic touch PCB 36 to verify successful operation of the touch pads 37. Furthermore, the skilled person will realise that it would be possible to have two or more separate windows provided on or mounted in the one downhole tool where one incorporated the window 32, 320 and touch pad 37 arrangement disclosed herein and another window provided a sealed environment for the LEDs 38 to be observed but the skilled person will also realise that it is much preferred to have just the one window 32, 320 to house both the touch pad 37 and also the LEDs 38 in order to minimise cost and simplify manufacturing as far as possible and also to minimise the number of potential leak points for downhole fluid. The skilled person will also realise that particularly with the pressure retaining embodiment 300, it is preferable to have a smaller diameter for the window 32, 320 than a larger diameter because a smaller diameter minimises the surface area that the differential pressure can act upon and therefore minimises the resulting hydraulic loading on the window 320.

The O-ring 21 is preferably a BS120 O-ring but other suitable O-rings could also be used. The O-ring 21 will prevent downhole fluids from making contact with the PCBs 44, 37.

The window 32, 320 must be thick enough to provide the strength that is required to prevent the window 32, 320 from cracking under the potential differential pressure that is across it and in the embodiments disclosed herein the window 32, 320 is preferably in the region of 5-15 mm in thickness and more preferably is in the region of 9-10 mm thickness and most preferably is 9.5 mm thick. The window 32, 320 is preferably manufactured from sapphire ($Al_2O_3$) and must be robust/thick enough to withstand downhole shocks and vibrations but also must not be so thick as to not fit in the side wall 15 of the downhole tool housing 10 and also must not be so thick as to prevent the detection of a person touching the outer surface 34, 340. It should be noted however that although the preferred material for the window 32, 320 is sapphire glass (which amongst other reasons has the advantages that it is a) non-conductive and b) that it is transparent and therefore an operator can see through it so that they can have a visual indication from the LED's 38) there are other non-conductive windows that could also be used for example plastic, wood etc (although wood would not have the advantage of being transparent). However the sapphire glass window 32, 320 is preferred because it provides a non-conductive window 32; 320 between the touch pad 37 and the user's finger.

The LEDs 38 are used as a visual indicator to confirm successful operation of the touch pad 37. In addition to being a simple on/off switch, when the touch pad 37 is combined with an array of LEDs 38 (or visual indicators), the touch pad 37 can be used to configure a multitude of downhole tool or other component settings. Advantageously, these settings can be made or checked without the need to disassemble any part of the housing 10 in the field. This benefit is particularly important in the oilfield where intrinsically safe (ie non-sparking) equipment is required.

The window 32, 320 and LED array 38 are also a valuable safety indicator for downhole tools that use lithium batteries. There are safety risks involved in the use of tools with lithium batteries. It is common practice to quarantine a device for a period of time if the product contains lithium batteries and has become unresponsive. It is often not possible to determine the state of a device without disassembling the product to access a communication port. If the lithium batteries are in an unstable condition this is a hazardous practice. The window 32 and LED 38 array provide a useful indicator to the tool's state without the need to disassemble the device.

An example of the operating instructions for the touch controller 30, 300 are as follows:

1. Tool Turn On.
   Hold down finger such that it touches the upper outer surface 34, 340 of window 32, 320 for 3 seconds.
   LEDs 38 flash—odd then even LEDs three times.
   12 o'clock green LED 38G flashing—prompting user for input. This is known as start mode. Blue LED 38B at one o'clock position (1 hour selected) is on solid waiting for touches to be made.
   Touch controller 30, 300 then waits 10 seconds for input (ie a touch to be registered). If no input received, touch controller 30, 300 turns off.
2. Set Time
   Touch window 32, 320 and release for each LED increment. Each LED 38B represents 1 hour. On start, the LED 38B at 1 o'clock is solid. After one tap of the window 32, 320, the two o'clock LED turns on solid. For each tap the next LED 38B in turn comes on solid. If the twelve o'clock LED 38B is lit and the user touches the window 32, 320, then all LEDs 38B will turn off and the one o'clock LED 38B will turn on solid.
   Wait 10 seconds then all selected LEDs 38B flash for 10 seconds.
   If no confirmation touch of the window 32, 320 is received then the touch controller 30, 300 returns to the LED 38B at 1 o'clock solid with green 38G at twelve o'clock flashing.
   If confirmation touch of the window 32, 320 is received, then the diagnostic test is started. This is signified by the spinning LEDs 38B.
   If diagnostic test is OK, green LED 38G stays on solid continuously (until down-hole). Timer LEDs 38B come on for 2 seconds every 20 seconds.
   If diagnostic test is failed, red flashing LED 38R comes on. Wait 1 minute and then return to the LED 38B at 1 o'clock being on solid.
   Touch glass window 32, 320 for a re-try.
3. Deck Test
   This is a test that is typically conducted on the deck of the rig just prior to including the downhole tool (within which the tool housing 10 is incorporated) into the string to run downhole and is intended to test that the downhole tool (such as a setting tool for setting a plug etc.) as instructed by the touch controller 30; 300 is capable of generating the required force to actuate the other downhole tool or other piece of equipment that needs to be set downhole. So, for example, a plug (not shown) which requires a force of 55,0000 lbs to be applied to it to set the plug in the well will require the setting tool to be able to generate at least 55,000 lbs of force.
   The deck test comprises the steps of:
   Tap window and release 12 times so that the LEDs 38B are lit up to 12 o'clock.
   If you tap 13 times, the touch controller 30, 300 re-starts at 1 o'clock.
   If 12 LEDs 38B are selected, wait 10 seconds then all 12 LEDs 38B start flashing. There are then 10 seconds for user to confirm start of deck test with a single touch of the window 32, 320.
   LEDs 38B spin while motor of for example the setting tool is running.
   The deck test can be aborted at any point by tapping the window 32, 320.
   When motor has stalled, red flashing LED 38R with flashing blue LEDs 38B.
   The number of blue LEDs 38B correspond to the force in 10,000 lbs increments the tool generated. The touch controller 30, 300 will continue to show the force using the blue lit LED's 38B. Once the force drops below a suitable threshold, the touch controller 30, 300 will return to the set time mode.
   Accordingly, for the example given above of a plug which takes 55,000 lbs to set, the touch controller 30, 300 can be used to conduct a deck test on the connected setting tool which when conducted, a test of 6 or more lit up blue LED's 38B would indicate that the setting tool has just generated a load in excess of 60,000 lbs and therefore would have enough force to set the plug in the wellbore. Again for example if say only 4 LED's lit up after the deck test then this would indicate the setting tool has generated a load in excess of 40,000 lbs but less than 50,000 lbs and would therefore not be able to set a plug which takes 55,000 lbs but the operator would know that before the time and cost was incurred of running the housing 10 and associated setting tool and plug into the wellbore.
4. Auto Turn off
   If a successful set is achieved, touch controller 30, 300 should turn itself off.
   If the tool housing 10, 100 is left stationary for more than 6 hours at a temperature less than 50° C., the touch controller 30, 300 will turn off.

Accordingly, the touch controller 30, 300 provides many advantages over conventional control mechanisms for downhole tools such as:

1. Internal electronics (and therefore tool settings) can be configured externally without the need to access or break seals to internal sealed chambers.
2. Intrinsically safe switching method. The touch controller 30, 300 can be switched on/off via the touch window 32, 320, minimising the explosion risk in hazardous areas.
3. No peripheral equipment is required (ie no laptops, cables, connectors).
4. The touch window 32, 320 provides an instantaneous visual communication method regarding the touch controller 30, 300 status prior to and following tool operation. Many existing prior art products require the controller to be partially disassembled to access electronics memory for wired or wireless memory download. In contrast, the touch pad 37 with LED 38 indicators of embodiments of the present invention allows instant visual communication indicating status prior to operation, tool performance during service testing and/or an indication post operation as to whether or not the touch controller 30, 300 delivered the desired output.
5. Intuitive and easy to use. Using the touch controller 30, 300 the following modes can be programmed:
   a. Switch on/off
   b. Set Timer for tool operation
   c. Perform Tool diagnostic test
6. Pressure retaining. The touch controller 30, 300 embodiments hereinbefore described use a design of window 32, 320 which is capable of surviving the high pressure, high temperature, high shock/vibration environment the touch controller 30, 300 is exposed to in a downhole environment.
7. Intuitive LED 38 control interface. The clock face style LED 38 array is easy to program and understand.

Modifications and improvements may be made to the embodiments described herein without departing from the scope of the invention. For example, the touch controller 30, 300 can be modified to be connected to a Bluetooth™ data transmission system (or other suitable wireless data transmission system) located within the downhole tool housing 10 such that the touch controller 30, 300 when touched is adapted to switch the Bluetooth™ data transmission system on such that it can then be connected to another Bluetooth™ data transmission system located within for example a laptop or tablet or other user operated device to enable the said user operated device to be wirelessly connected to Bluetooth™ data transmission system located within the downhole tool housing 10 such that the latter can be controlled by and can send data back to the user wirelessly and this arrangement provides the great advantage that the Bluetooth™ data transmission system located within the downhole tool housing 10 need only be switched on when required and this saves considerable battery life.

The invention claimed is:

1. A controller, mounted on or within a downhole tool, the controller comprising a touch operated control device, wherein the touch operated control device comprises a touchable surface, wherein the touchable surface is mounted on or in the downhole tool such that the touchable surface is outwardly facing and is provided on or in an outer surface of the downhole tool such that an operator may touch the touchable surface without having to disassemble the downhole tool, wherein the touchable surface is stationary at all times during use in that it does not require to be moved or switched.

2. A controller in accordance with claim 1, further comprising one or more microprocessors in communication with the touch operated control device.

3. A controller in accordance with claim 2, wherein the one or more microprocessors are in electrical or electronic communication with the touch operated control device.

4. A controller in accordance with claim 2, wherein the microprocessor is capable of being programmed by an operator to instruct a downhole tool to actuate wherein the operator instructs the controller by touching the touch operated control device with one or more distinct touches.

5. A controller in accordance with claim 1, wherein the touch operated control device is adapted to sense an operator touching the touchable surface.

6. A controller in accordance with claim 5, wherein the touch operated control device is adapted to sense one or more touches from an operator.

7. A controller in accordance with claim 6, wherein the touch operated control device is adapted to sense the time duration of each touch.

8. A controller in accordance with claim 7, wherein the one or more touches and the duration of the touches represent instructions from an operator.

9. A controller in accordance with claim 1, wherein the downhole tool comprises a housing and an aperture formed in a sidewall of the housing wherein the controller is mounted within the aperture.

10. A controller in accordance with claim 9, wherein the controller is mounted within the aperture such that the touchable surface is the radially outermost component of the controller.

11. A controller in accordance with claim 10, wherein the controller is mounted within the aperture such that the touchable surface faces outwardly therefrom.

12. A controller in accordance with claim 9, wherein the controller is retained within the aperture by a locking means.

13. A controller in accordance with claim 1, wherein the touchable surface is a surface of a window.

14. A controller in accordance with claim 13, wherein the window comprises a transparent window through which light may pass without substantial restriction and through which an operator may view one or more components located beneath the window.

15. A controller in accordance with claim 14, wherein the one or more components are one or more visual indication means.

16. A controller in accordance with claim 14, wherein the controller further comprises a sealing means to seal the said aperture with respect to the window.

17. A controller in accordance with claim 16, wherein the sealing means seals a gap between an inner cylindrical bore of the said aperture and an outer sidewall of the said window.

18. A controller in accordance with claim 17, wherein the aperture comprises a cylindrical groove formed in its inner cylindrical bore wherein the cylindrical groove comprises a larger diameter than the diameter of the rest of the inner cylindrical bore of the aperture and wherein the sealing means is located within the said cylindrical groove and is sufficiently sized so as to act at least against the outer sidewall of the window and the outer diameter of the cylindrical groove.

19. A controller in accordance with claim 17, wherein the window comprises an outer diameter which is slightly less than the inner diameter of the said cylindrical bore of the aperture such that it is a sliding fit or clearance fit therein.

20. A controller in accordance with claim 1, further comprising a controller housing and which comprises a bore adapted to house one or more components.

21. A controller in accordance with claim 20, wherein a microprocessor and one or more light displays are housed within the said bore of the controller housing.

22. A controller in accordance with claim 21, wherein a plurality of light displays are mounted on a printed circuit board around a periphery of the board.

23. A controller in accordance with claim 20, wherein the controller housing comprises an angled surface adapted to reduce the risk of or prevent damage occurring to the sealing means as the controller housing is moved past the sealing means during installation of the controller housing within the aperture.

24. A controller in accordance with claim 13, wherein the touch operated control device further comprises a touch sensor adapted to sense if and/or when the said touchable surface of the window is touched.

25. A controller in accordance with claim 24, wherein the touch sensor is adapted to sense if and/or when the said surface of the window is touched by a body part of an operator.

26. A controller in accordance with claim 25, wherein the touch sensor is located radially inwardly of the window and is adapted to sense if and/or when the said surface of the window is touched by a body part of an operator through the depth of the window.

27. A controller in accordance with claim 26, wherein the touch sensor is also housed within the bore of the said housing.

28. A controller in accordance with claim 13, wherein the window is formed of a material which comprises at least one, one or all of the following characteristics:
 substantially optically transparent;
 relatively high strength;
 relatively high hardness on the Mohs Scale; and
 substantially scratch-resistant.

29. A controller in accordance with claim 13, wherein the depth of the window is in the region of 20% to 50% of the diameter of the window.

30. A controller in accordance with claim 24, wherein the touch sensor comprises an electrical conductor which when a voltage is applied thereto, creates a uniform electrostatic field in at least a region of the window.

31. A controller in accordance with claim 30, wherein the touch sensor is arranged such that an operator touching the outer surface of the window creates a capacitor which is sensed by the touch sensor and the touch sensor instructs the microprocessor accordingly.

32. A controller in accordance with claim 24, wherein a plurality of light displays are mounted on a printed circuit board around a periphery of the board and the touch sensor comprises a substantially circular touch pad located at the centre of the board such that the plurality of light displays are equi-spaced with respect to each light display on either side and each of the plurality of light displays are located substantially the same distance apart from the closest point of the circular touch pad to that light display.

33. A controller in accordance with claim 13, wherein the controller is pressure balanced in that the pressure experienced on one face of the window is substantially pressure balanced with the pressure experienced on the other face of the window.

34. A controller in accordance with claim 13, wherein the controller is pressure retaining in that the controller is arranged to prevent the pressure outside of the downhole tool and therefore acting on the outer face of the window from being communicated to the inside of the downhole tool and therefore prevented from acting on the inner face of the window, in which case the controller is adapted to prevent the resulting differential pressure from moving the window inwardly.

35. A controller in accordance with claim 34, wherein the pressure balanced controller comprises a window having tapering sidewalk which taper inwardly from radially outermost to innermost with reference to the longitudinal axis of the downhole tool and which are arranged to abut against and therefore spread the load against a sidewall of the downhole tool which tapers inwardly from radially outermost to innermost with reference to the longitudinal axis of the downhole tool.

36. A controller in accordance with claim 35, wherein the angle of the taper of the sidewall of the window substantially equals the angle of the taper of the sidewall of the downhole tool.

37. A controller in accordance with claim 32, wherein the controller comprises a power supply to power any one, more than one or all of the said touch pad and/or a microprocessor and/or the light displays.

38. A controller in accordance with claim 32, wherein the touch pad and the microprocessor are arranged such that every separate and distinct touch by an operator of the said surface of the window is registered and acted upon by the microprocessor and wherein an operator actuates the controller to activate by touching the said surface of the window for at least a pre-determined period of time and the controller is adapted to flash one or more of the light displays upon activation of the controller.

39. A controller in accordance with claim 38, wherein the touch sensor is arranged to sense further touches within a further pre-determined period of time, the microprocessor is arranged to store the said number of touches and assign a pre-determined time value to each sensed touch and the controller is arranged to activate one of said light display for each touch sensed and activate each said light display in turn in a clockwise direction around a clock-like arrangement of the plurality of light displays.

40. A controller in accordance with claim 38, wherein the controller comprises a further sensor configured to instruct the microprocessor that the downhole tool has been run in downhole, wherein upon receipt of such instruction the microprocessor is configured to start a countdown to tool activation phase wherein each light display is configured to be lit for a pre-determined period of time, which together add up to the total period of time before which the controller instructs the actuation of the downhole tool that requires to be actuated.

41. A controller in accordance with claim 40, wherein the microprocessor is adapted to deactivate and switch off if the controller remains stationary for more than a predetermined period of time at a temperature less than a pre-determined temperature.

42. A controller in accordance with claim 1, further comprising a wireless data transmission system located within a housing of the downhole tool, wherein the controller is arranged, when touched, to activate the wireless data transmission system located within the housing of the downhole tool such that it can then be connected to another wireless data transmission system located outwith the downhole tool housing to enable an operator to wirelessly connect to the controller and further enable the operator to at least one of transmit data to the controller and to receive data from the controller.

43. A method of operating a controller mounted on or within a downhole tool, the method comprising the steps of:
providing a controller comprising a micro processor and a touch operated control device;
actuating the controller to activate by touching the said touch operated control device for at least a pre-determined period of time; and
sensing further touches within a further pre-determined period of time, the microprocessor storing the said number of touches and assigning a pre-determined instruction to each sensed touch;
wherein the touch operated control device comprises a touchable surface, wherein the touchable surface is mounted on or in the downhole tool such that the touchable surface is outwardly facing and is provided on or in an outer surface of the downhole tool such that an operator may touch the touchable surface without having to disassembly the downhole tool, wherein the touchable surface is stationary at all times during use in that it does not require to be moved or switched.

44. A method of operating the controller of a downhole tool in accordance with claim 43, wherein the pre-determined instruction is a period of time before the controller instructs the said downhole tool or a further downhole tool to actuate.

45. A method of operating the controller of a downhole tool in accordance with claim 43, wherein the pre-determined instruction comprises an instruction to actuate a particular downhole tool from a selection of downhole tools.

46. A method of operating the controller of a downhole tool in accordance with claim 43, wherein the downhole tool to be actuated and/or otherwise controlled by the controller is any downhole tool requiring to be controlled or actuated.

47. A method of operating the controller of a downhole tool in accordance with claim 43, further comprising providing a wireless data transmission system located within a housing of the downhole tool, wherein the controller is activated and thereafter activates the wireless data transmission system located within the housing of the downhole tool such that it can then be connected to another wireless data transmission system located outwith the downhole tool housing to enable an operator to wirelessly connect to the controller and further enable the operator to at least one of transmit data to the controller and to receive data from the controller.

48. A downhole tool, the downhole tool comprising a controller in accordance with claim 1.

49. A method of operating the controller of a downhole tool in accordance with claim 43, wherein the method includes registering and acting upon every separate and distinct touch of an operator on the said surface of the window by the microprocessor, and an operator actuating the controller to activate by touching the said surface of the window for at least a pre-determined period of time, wherein the controller flashes one or more of the light displays upon activation of the controller.

50. A method of operating the controller of a downhole tool in accordance with claim 49, wherein if further touches are sensed by the touch sensor within a further pre-determined period of time, the method includes storing said number of touches by the microprocessor and assigning each sensed touch a pre-determined time value by the microprocessor; and as each touch is sensed, activating one said light display by the controller for each touch sensed, in turn, in a clockwise direction around a clock-like arrangement of the plurality of light displays.

51. A method of operating the controller of a downhole tool in accordance with claim 49, the method including a further sensor instructing the microprocessor that the downhole tool has been run in downhole; following which the microprocessor starts a countdown to tool activation phase wherein each lit light display equals a pre-determined period of time which together add up to the total period of time before which the controller instructs the actuation of the downhole tool that requires to be actuated.

52. A method of operating the controller of a downhole tool in accordance with claim 51, including deactivating and switching off the microprocessor if the controller remains stationary for more than a predetermined period of time at a temperature less than a pre-determined temperature.

* * * * *